United States Patent
Arthur et al.

(10) Patent No.: US 11,289,738 B2
(45) Date of Patent: Mar. 29, 2022

(54) NONAQUEOUS ELECTROLYTE COMPOSITIONS COMPRISING LITHIUM OXALATO PHOSPHATES

(71) Applicant: SOLVAY SA, Brussels (BE)

(72) Inventors: Samuel David Arthur, Wilmington, DE (US); Stephen E. Burkhardt, Wilmington, DE (US); Kostantinos Kourtakis, Media, PA (US); Brian Levy-Polis, Newark, DE (US); Jun J. Liu, Wilmington, DE (US); Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 39 days.

(21) Appl. No.: 15/749,807

(22) PCT Filed: Jun. 3, 2016

(86) PCT No.: PCT/US2016/035739
§ 371 (c)(1),
(2) Date: Feb. 2, 2018

(87) PCT Pub. No.: WO2017/023409
PCT Pub. Date: Feb. 9, 2017

(65) Prior Publication Data
US 2018/0241086 A1 Aug. 23, 2018

Related U.S. Application Data
(60) Provisional application No. 62/200,905, filed on Aug. 4, 2015.

(51) Int. Cl.
*H01M 10/0568* (2010.01)
*H01M 10/052* (2010.01)
*H01M 10/0567* (2010.01)
*H01M 10/0569* (2010.01)
*H01M 4/131* (2010.01)
H01M 4/02 (2006.01)

(52) U.S. Cl.
CPC ....... *H01M 10/0568* (2013.01); *H01M 4/131* (2013.01); *H01M 10/052* (2013.01); *H01M 10/0567* (2013.01); *H01M 10/0569* (2013.01); *H01M 2004/028* (2013.01); *H01M 2300/0034* (2013.01)

(58) Field of Classification Search
CPC ........... H01M 10/052; H01M 10/0567; H01M 10/0568; H01M 2004/028; H01M 2300/0034; H01M 4/131; H01M 10/0569
USPC .................................................. 429/231.95
See application file for complete search history.

(56) References Cited

U.S. PATENT DOCUMENTS

| | | |
|---|---|---|
| 5,738,957 A | 4/1998 | Amine et al. |
| 5,962,166 A | 10/1999 | Ein-Eli et al. |
| 6,680,145 B2 | 1/2004 | Obrovac et al. |
| 6,964,828 B2 | 11/2005 | Lu et al. |
| 7,026,070 B2 | 4/2006 | Noguchi et al. |
| 7,078,128 B2 | 7/2006 | Lu et al. |
| 7,303,840 B2 | 12/2007 | Thackeray et al. |
| 7,381,496 B2 | 6/2008 | Onnerud et al. |
| 7,468,223 B2 | 12/2008 | Thackeray et al. |
| 7,541,114 B2 | 6/2009 | Ohzuku et al. |
| 7,718,319 B2 | 5/2010 | Manthiram et al. |
| 8,389,160 B2 | 3/2013 | Venkatachalam et al. |
| 8,394,534 B2 | 3/2013 | Lopez et al. |
| 8,518,525 B2 | 8/2013 | Dennes et al. |
| 8,535,832 B2 | 9/2013 | Karthikeyan et al. |
| 2014/0038059 A1 | 2/2014 | Li et al. |
| 2014/0154591 A1 | 6/2014 | Yokotsui et al. |
| 2014/0322616 A1 | 10/2014 | Onozaki et al. |
| 2014/0323503 A1* | 10/2014 | Hoffman ............... A61K 31/437 514/260.1 |
| 2015/0155601 A1 | 6/2015 | Nakatsutsumi et al. |
| 2015/0171467 A1* | 6/2015 | Dubois ............. H01M 10/0567 429/163 |

FOREIGN PATENT DOCUMENTS

| | | |
|---|---|---|
| CN | 103354297 A | 10/2013 |
| EP | 2741362 A1 | 6/2014 |
| JP | 2005 317446 A | 11/2005 |
| JP | 2006164867 A | 6/2006 |
| JP | 2012-64472 A | 3/2012 |
| JP | 2014-110235 A | 6/2014 |
| WO | 2014/065246 A | 5/2014 |

OTHER PUBLICATIONS

Wietelmann, et al., "Tris(oxalato)phosphorus Acid and Its Lithium Salt", Chem Eur. J. 2004, vol. 10, pp. 2451-2458.
Jun Liu and Arumugam Manthiram, "Understanding the Improved Electrochemical Performances of Fe-Substituted 5 V Spinel Cathode LiMn1.5Ni0.5O4", J. Phys. Chem., 2009, vol. 113, pp. 15073-15079.
Sukeun Yoon and Arumugam Manthiram, "Sb—MOx—C (M = Al, Ti, or Mo) Nanocomposite Anodes for Lithium-Ion Batteries", Chem. Mater. 2009, vol. 21, pp. 3898-3904.

\* cited by examiner

*Primary Examiner* — Jonathan G Jelsma
*Assistant Examiner* — Omar M Kekia
(74) *Attorney, Agent, or Firm* — Osha Bergman Watanabe & Burton LLP

(57) ABSTRACT

Described herein are: An electrolyte composition comprising a) a fluorinated solvent for an electrolyte salt; b) an oxalate salt represented by the Formula $LiPF_{(6-2q)}(Ox)_q$, wherein Ox is an oxalate moiety and q is 1, 2 or 3; and c) optionally, at least one electrolyte salt. In some embodiments, the electrolyte composition comprises a mole ratio of Ox/P in the range of from 0.001 to 5. The electrolyte compositions are useful in electrochemical cells, such as lithium ion batteries.

15 Claims, No Drawings

NONAQUEOUS ELECTROLYTE COMPOSITIONS COMPRISING LITHIUM OXALATO PHOSPHATES

CROSS-REFERENCE TO RELATED APPLICATION

This application is a U.S. national stage entry under 35 U.S.C. § 371 of International Application No. PCT/US2016/035739 filed Jun. 3, 2016, which claims benefit of U.S. patent application Ser. No. 62/200,905, filed Aug. 4, 2015. The entire contents of these applications are explicitly incorporated herein by this reference.

FIELD OF DISCLOSURE

The disclosure herein relates to electrolyte compositions that include lithium phosphorus oxalates, which are useful in electrochemical cells, such as lithium ion batteries.

BACKGROUND

Batteries containing electrodes made from alkali metals, alkaline earth metals, or compounds comprising these metals—for example lithium ion batteries—typically include non-aqueous solvents for the electrolytes used in the batteries. An electrolyte solvent plays an important role in a battery, providing a medium for an electrolyte to move between the electrodes of the battery. Formulations of solvents with electrolytes typically include additives that enhance the performance and safety of the battery, and therefore a suitable solvent must dissolve the electrolyte as well as the additives. The solvent must also be stable under the conditions prevalent in an active battery system.

Electrolyte solvents used in lithium ion batteries typically incorporate organic carbonate compounds or mixtures, and typically include one or more linear carbonates such as, for example, ethyl methyl carbonate, dimethyl carbonate, or diethyl carbonate. Cyclic carbonates, such as ethylene carbonate, can also be included. However, at cathode potentials above about 4.35 V these electrolyte solvents can decompose, which can result in a loss of battery performance.

Various approaches have been investigated to overcome the limitations of commonly used non-aqueous electrolyte solvents. Although these electrolyte solvents can be used in lithium ion batteries having high cathode potentials, specifically at voltages greater than about 4.35 V, such as LiCoO$_2$ or LiNi$_x$Mn$_y$Co$_z$O$_2$ where x+y+z is about 1, cycling performance—that is, the ability to efficiently discharge and charge the battery to full capacity multiple times—can be limited.

A need remains for electrolyte solvent formulations that will have improved performance when used in a lithium ion battery, particularly such a battery that operates with a high cathode potential (from about 4.1 up to about 5 V).

SUMMARY

In one aspect, the present application discloses an electrolyte composition comprising a fluorinated solvent and a lithium oxalato phosphate, suitable for use in a battery, wherein the battery has cycle performance that is surprisingly improved over the cycling performance of a battery that does not include the composition disclosed herein.

In one embodiment, there is provided herein an electrolyte composition comprising:
a) a fluorinated solvent;
b) an oxalate salt represented by the Formula:

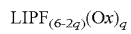

wherein Ox is an oxalate (C$_2$O$_4$) moiety, and q is 1, 2 or 3; and
c) optionally, at least one electrolyte salt.

In some embodiments, the electrolyte composition comprises a mole ratio of Ox/P in the range of from about 0.001 to about 5. In some embodiments, the electrolyte composition comprises a mole ratio of Ox/P in the range of from about 0.1 to about 0.5 In some embodiments, the electrolyte composition further comprises lithium bis(oxalato)borate, and the mole ratio of Ox/B of the electrolyte composition is above 2. In some embodiments, the oxalate salt comprises lithium tris(oxalato)phosphate. In some embodiments, the electrolyte salt is present, and the electrolyte salt comprises LiPF$_6$.

In one embodiment, the fluorinated solvent is at least one fluorinated solvent selected from fluorinated acyclic carboxylic acid esters, fluorinated acyclic carbonates, and fluorinated acyclic ethers. In some embodiments, the fluorinated acyclic carboxylic acid ester comprises 2,2-difluoroethyl acetate.

In some embodiments, the electrolyte composition further comprises:
i) a cyclic sultone represented by the formula:

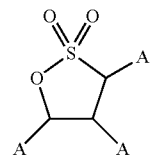

wherein each A is independently a hydrogen, fluorine, or an optionally fluorinated alkyl, vinyl, allyl, acetylenic, or propargyl group;

ii) a cyclic sulfate represented by the formula:

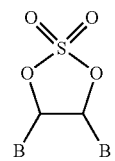

wherein each B is independently a hydrogen or an optionally fluorinated vinyl, allyl, acetylenic, propargyl, or C$_1$-C$_3$ alkyl group;

iii) a cyclic carboxylic acid anhydride selected from the group consisting of the compounds represented by Formula (I) through Formula (VIII):

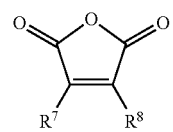

I

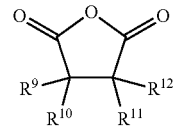

II

-continued

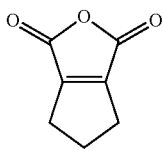

III

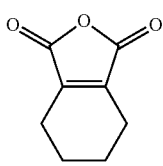

IV

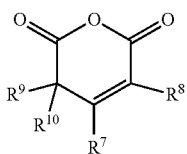

V

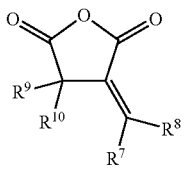

VI

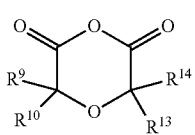

VII

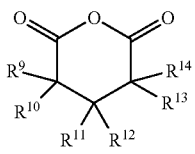

VIII wherein $R^7$ to $R^{14}$ is each independently H, F, a linear or branched $C_1$ to $C_{10}$ alkyl radical optionally substituted with F, alkoxy, and/or thioalkyl substituents, a linear or branched $C_2$ to $C_{10}$ alkene radical, or a $C_6$ to $C_{10}$ aryl radical;

or a combination thereof.

In another embodiment, there is provided herein an electrochemical cell comprising an electrolyte composition disclosed herein. In another embodiment, the electrochemical cell is a lithium ion battery. In a further embodiment, the electrochemical cell is a lithium ion battery operating at a potential of greater than about 4.1V.

In yet another embodiment, a method to form an electrolyte composition is disclosed, the method comprising the step of combining:

a) a fluorinated solvent;
b) an oxalate salt represented by the Formula:

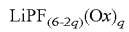

$$LiPF_{(6-2q)}(Ox)_q$$

wherein Ox is an oxalate moiety, and q is 1, 2 or 3;
c) and optionally, at least one electrolyte salt.

Other aspects of the disclosed invention may be inherent or understood from the disclosure provided herein even though not specifically described with particularity or completely embodied in a single example of this application, but which may nonetheless be synthesized by one of ordinary skill in the art from the totality of the description, the examples, and the claims provided in the present application, that is, the whole of this specification.

DETAILED DESCRIPTION

As used above and throughout the disclosure, the following terms, unless otherwise indicated, shall be defined as follows:

The term "electrolyte composition" as used herein, refers to a chemical composition that includes—at a minimum—a solvent for an electrolyte salt and an electrolyte salt, wherein the composition is capable of supplying an electrolyte in an electrochemical cell. An electrolyte composition can include other components, for example additives to enhance the performance of the battery in safety, reliability, and or efficiency.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

An "electrolyte solvent" as defined herein is a solvent or a solvent mixture for an electrolyte composition that comprises a fluorinated solvent.

The term "anode" refers to the electrode of an electrochemical cell, at which oxidation occurs. In a secondary (i.e. rechargeable) battery, the anode is the electrode at which oxidation occurs during discharge and reduction occurs during charging.

The term "cathode" refers to the electrode of an electrochemical cell, at which reduction occurs. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

The term "oxalate to phosphorus ratio" or "Ox/P ratio" as used herein means the mole ratio of moles of oxalate moieties in the electrolyte composition to the total moles of phosphorus in the electrolyte composition present from all added components.

The term "oxalate to boron ratio" or "Ox/B ratio" as used herein means the mole ratio of moles of oxalate moieties in the electrolyte composition to the total moles of boron in the electrolyte composition present from all added components.

The equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

The term "alkyl group", as used herein, refers to a linear or branched chain hydrocarbon group containing no unsaturation.

The term "fluoroalkyl group", as used herein, refers to an alkyl group wherein at least one hydrogen is replaced by fluorine.

Disclosed herein are electrolyte compositions comprising:
a) a fluorinated solvent;
b) an oxalate salt represented by the Formula:

$$\text{LiPF}_{(6-2q)}(\text{Ox})_q$$

wherein Ox is an oxalate ($C_2O_4$) moiety, and q is 1, 2 or 3; and c) optionally, at least one electrolyte salt.

The electrolyte composition comprises a mole ratio of oxalate moiety to phosphorus ("Ox/P") in the range of from about 0.001 to about 5. In some embodiments, the mole ratio of Ox/P of the electrolyte composition is in the range of from about 0.01 to about 5, or from about 0.01 to about 3, or for example from about 0.01 to about 1, or for example from about 0.1 to about 0.5, or for example from about 0.001 to about 3, or for example from about 1 to about 3, or for example from about 2 to about 3, or for example from about 2 to about 5.

The electrolyte compositions described herein comprise lithium oxalato phosphate compounds given by the Formula $\text{LiPF}_{(6-2q)}(\text{Ox})_q$, wherein Ox is an oxalate ($C_2O_4$) moiety, and q is 1, 2 or 3. When q=3, the lithium oxalato phosphate is lithium tris (oxalato) phosphate, $\text{LiP(Ox)}_3$, which is abbreviated herein as LiTOP. When q=2, the lithium oxalato phosphate is lithium difluorobis(oxalato) phosphate, $\text{LiPF}_2(\text{Ox})_2$. When q=1, the lithium oxalato phosphate is lithium tetrafluoro(oxalato) phosphate, $\text{LiPF}_4(\text{Ox})$.

Electrolyte solvent mixtures comprising lithium oxalato phosphate complexes in fluorinated solvents as described herein may comprise oxalato phosphates that exist in various stages or degrees of complexation, including, for example, intermediate forms wherein the oxalate group forms a monodentate complex with phosphorus, wherein just one of the single bonded oxygen atoms of an oxalate moiety is bonded to phosphorus. The bi-dentate form, wherein both single-bonded oxygen atoms from the oxalate are bonded to phosphorus is typically the predominant form. For convenience, the term "oxalato-phosphate(s)" or, alternatively "oxalato-phosphate electrolyte derivatives" shall be used generically, unless stated otherwise, to refer to any individual oxalato phosphates, or alternatively any combination or all of the various compositions that can comprise oxalato phosphates defined by the Formula $\text{LiPF}_{(6-2q)}(\text{Ox})_q$, or that otherwise may exist in the composition.

Oxalato-phosphates can be added to an electrolyte composition as a discrete component. The commercial availability of oxalato-phosphates is limited at the drafting of this application but an oxalato phosphate can be prepared by known processes, see for example, *Chem. Eur. J.*, 2004, 10, 2451. LiTOP, for example, can be prepared by a process wherein oxalic acid or its derivative is reacted with an active phosphorus compound such as phosphorus pentachloride. Suitable derivatives of oxalic acid are, for example, oxalyl chloride or oxalyl bromide. In an example provided herein, oxalic acid is reacted with phosphorus pentachloride in a first step, followed by contact with lithium hydride in a second step to produce LiTOP. Other conventional preparations of LiTOP may be known and used to prepare LiTOP to be added into the electrolyte composition.

An electrolyte composition comprises LiTOP in an amount that is effective in improving the cycling performance (either the cycle life, which is the number of cycles to 80% capacity retention or equivalently, the capacity retention at a given number of cycles) of an electrochemical cell, as compared to that in the absence of LiTOP. An effective amount of oxalato phosphate can be an amount of at least about 0.01 wt % to 25 wt % based on the weight percentage of the additive in the entire electrolyte composition. Alternatively, an effective amount of LiTOP is from about 0.1 wt % to about 10 wt %, or from about 1 wt % to about 7 wt %, or from about 1 wt % to about 5 wt %.

Oxalato phosphates, when added to an electrolyte composition comprising a fluorinated electrolyte salt such as $\text{LiPF}_6$ for example, can undergo reactions with the electrolyte components to form derivative species. For example, at least one oxalate group from the oxalato phosphate can displace one or more fluoride ions from fluorinated salts, typically $\text{LiPF}_6$, of the electrolyte composition to form a derivative of the electrolyte having an oxalate substituent. Various degrees of substitution of oxalate for fluoride can take place to yield a variety of derivative species in the electrolyte composition.

In one embodiment, the electrolyte composition comprises LiTOP as an oxalate salt. In one embodiment, the electrolyte composition comprises LiTOP as an oxalate salt, and the electrolyte composition is free of additional electrolyte salt. In one embodiment, the electrolyte composition comprises LiTOP as an oxalate salt, and further comprises an electrolyte salt. In one embodiment, the electrolyte composition comprises LiTOP as the oxalate salt, and further comprises an electrolyte salt comprising $\text{LiPF}_6$.

The electrolyte compositions disclosed herein may further comprise at least one lithium boron compound, such as lithium terafluoroborate, lithium bis(oxalato)borate, lithium difluoro(oxalato)borate, other lithium boron salts, $\text{Li}_2\text{B}_{12}\text{F}_{12-x}\text{H}_x$, wherein x is 0 to 8, mixtures of lithium fluoride and anion receptors such as $\text{B(OC}_6\text{F}_5)_3$, or mixtures thereof. In one embodiment, the electrolyte compositions additionally comprise at least one lithium borate salt selected from lithium bis(oxalato)borate, lithium difluoro (oxalato)borate, lithium tetrafluoroborate, or mixtures thereof. In some embodiments, the electrolyte composition comprises lithium bis(oxalato)borate. In some embodiments, the electrolyte composition comprises lithium difluoro(oxalato)borate. In some embodiments, the electrolyte composition comprises lithium tetrafluoroborate. The lithium borate salt may be present in the electrolyte composition in the range of from 0.1 to about 10 percent by weight, based on the total weight of the electrolyte composition, for example in the range of from 0.1 to about 5.0 percent by weight, or from 0.3 to about 4.0 percent by weight, or from 0.5 to 2.0 percent by weight. The lithium boron compounds can be obtained commercially or prepared by methods known in the art.

In another embodiment, the electrolyte composition further comprises at least one boron compound, and the Ox/P mole ratio of the electrolyte composition is in the range of from about 0.01 to about 5, for example about 0.1 to about 0.5. In another embodiment, the electrolyte composition further comprises boron compounds and the mole ratio of oxalate moiety to boron ("Ox/B") of the electrolyte composition is in the range of greater than 2 to about 20, for example from about 2 to about 10, or for example from about 2 to about 5. In some embodiments, the electrolyte composition further comprises boron compounds and the mole ratio of oxalate moiety to boron ("Ox/B") of the electrolyte composition is greater than 2. In some embodiments, the electrolyte composition further comprises lithium bis(oxalato)borate and the mole ratio of Ox/B of the electrolyte composition is above 2.

Optionally, the electrolyte compositions disclosed herein may comprise additional additives. In some embodiments, the electrolyte composition further comprises lithium bis(oxalato)borate and/or fluoroethylene carbonate. In some embodiments, the electrolyte composition further comprises fluoroethylene carbonate. In some embodiments, the electrolyte composition further comprises 1,3-propanesultone.

Optionally, an electrolyte composition as described herein further comprises a cyclic sultone, a cyclic sulfate, a cyclic carboxylic acid anhydride, or a combination thereof. Optionally, these additives may be used in combination with at least one lithium boron compound as described herein above.

In some embodiments, the electrolyte composition further comprises a cyclic sultone. Suitable sultones include those represented by the formula:

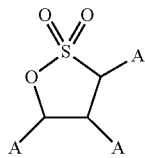

wherein each A is independently a hydrogen, fluorine, or an optionally fluorinated alkyl, vinyl, allyl, acetylenic, or propargyl group. The vinyl (H$_2$C=CH—), allyl (H$_2$C=CH—CH$_2$—), acetylenic (HC≡C—), or propargyl (HC≡C—CH$_2$—) groups may each be unsubstituted or partially or totally fluorinated. Each A can be the same or different as one or more of the other A groups, and two or three of the A groups can together form a ring. Mixtures of two or more of sultones may also be used. Suitable sultones include 1,3-propane sultone, 3-fluoro-1,3-propane sultone, 4-fluoro-1,3-propane sultone, 5-fluoro-1,3-propane sultone, and 1,8-naphthalenesultone. In one embodiment, the sultone comprises 1,3-propane sultone. In one embodiment, the sultone comprises 3-fluoro-1,3-propane sultone.

In one embodiment the sultone is present at about 0.01 to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, of the total electrolyte composition.

In some embodiments, the electrolyte composition further comprises a cyclic sulfate represented by the formula:

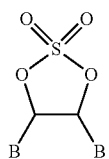

wherein each B is independently a hydrogen or an optionally fluorinated vinyl, allyl, acetylenic, propargyl, or C$_1$-C$_3$ alkyl group. The vinyl (H$_2$C=CH—), allyl (H$_2$C=CH—CH$_2$—), acetylenic (HC≡C—), propargyl (HC≡C—CH$_2$—), or C$_1$-C$_3$ alkyl groups may each be unsubstituted or partially or totally fluorinated. Mixtures of two or more of cyclic sulfates may also be used. Suitable cyclic sulfates include ethylene sulfate (1,3,2-dioxathiolane, 2,2-dioxide), 1,3,2-dioxathiolane, 4-ethynyl-, 2,2-dioxide, 1,3,2-dioxathiolane, 4-ethenyl-, 2,2-dioxide, 1,3,2-dioxathiolane, diethenyl-, 2,2-dioxide, 1,3,2-dioxathiolane, 4-methyl-, 2,2-dioxide, and 1,3,2-dioxathiolane, 4,5-dimethyl-, 2,2-dioxide. In one embodiment, the cyclic sulfate is ethylene sulfate. In one embodiment the cyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 0.5 weight percent to about 2 weight percent, or about 2 weight percent to about 3 weight percent. In one embodiment the cyclic sulfate is present at about 1 weight percent to about 3 weight percent or about 1.5 weight percent to about 2.5 weight percent, or about 2 weight percent of the total electrolyte composition.

In some embodiments, the electrolyte composition further comprises a cyclic carboxylic acid anhydride. Suitable cyclic carboxylic acid anhydrides include those selected from the group consisting of the compounds represented by Formula (I) through Formula (VIII):

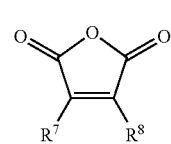

I

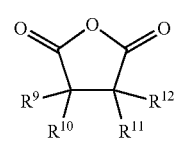

II

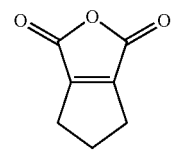

III

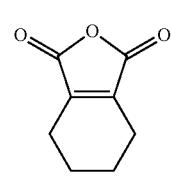

IV

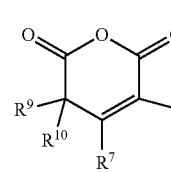

V

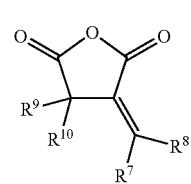

VI

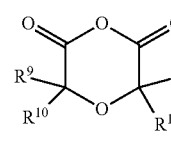

VII

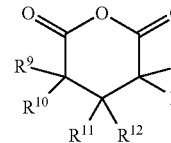

VIII wherein $R^7$ to $R^{14}$ is each independently H, F, a linear or branched C$_1$ to C$_{10}$ alkyl radical optionally substituted with F, alkoxy, and/or thioalkyl substituents, a linear or branched $C_2$ to $C_{10}$ alkene radical, or a $C_6$ to $C_{10}$ aryl radical. The alkoxy substituents can have from one to ten carbons and can be linear or branched; examples of alkoxy substituents include —$OCH_3$, —$OCH_2CH_3$, and —$OCH_2CH_2CH_3$. The thioalkyl substituents can have from one to ten carbons and can be linear or branched; examples of thioalkyl substituents include —$SCH_3$, —$SCH_2CH_3$, and —$SCH_2CH_2CH_3$. Examples of suitable cyclic carboxylic acid anhydrides include maleic anhydride; succinic anhydride; glutaric anhydride; 2,3-dimethylmaleic anhydride; citraconic anhydride; 1-cyclopentene-1,2-dicarboxylic anhydride; 2,3-diphenylmaleic anhydride; 3,4,5,6-tetrahydrophthalic anhydride; 2,3-dihydro-1,4-dithiino-[2,3-c] furan-5,7-dione; and phenylmaleic anhydride. A mixture of two or more of these cyclic carboxylic acid anhydrides can also be used. In one embodiment, the cyclic carboxylic acid anhydride comprises maleic anhydride. In one embodiment, the cyclic carboxylic acid anhydride comprises maleic anhydride, succinic anhydride, glutaric anhydride, 2,3-dimethylmaleic anhydride, citraconic anhydride, or mixtures thereof. Cyclic carboxylic acid anhydrides can be obtained from a specialty chemical company such as Sigma-Aldrich, Inc. (Milwaukee, Wis.), or prepared using methods known in the art. It is desirable to purify the cyclic carboxylic acid anhydride to a purity level of at least about 99.0%, for example at least about 99.9%. Purification can be done using methods known in the art.

In some embodiments, the electrolyte composition comprises about 0.1 weight percent to about 5 weight percent of the cyclic carboxylic acid anhydride, based on the total weight of the electrolyte composition. In some embodiments, the cyclic carboxylic acid anhydride is present in the electrolyte composition in a percentage by weight that is defined by a lower limit and an upper limit. The lower limit of the range is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 and the upper limit of the range is 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. All percentages by weight are based on the total weight of the electrolyte composition.

Optionally, the electrolyte compositions disclosed herein also contain at least one electrolyte salt. Suitable electrolyte salts include without limitation lithium hexafluorophosphate ($LiPF_6$), lithium bis(trifluromethyl)tetrafluorophosphate ($LiPF_4(CF_3)_2$), lithium bis(pentafluoroethyl)tetrafluorophosphate ($LiPF_4(C_2F_5)_2$), lithium tris(pentafluoroethyl)trifluorophosphate ($LiPF_3(C_2F_5)_3$), lithium bis(trifluoromethanesulfonyl)imide, lithium bis(perfluoroethanesulfonyl)imide, lithium (fluorosulfonyl) (nonafluorobutanesulfonyl)imide, lithium bis(fluorosulfonyl)imide, lithium tetrafluoroborate, lithium perchlorate, lithium hexafluoroarsenate, lithium trifluoromethanesulfonate, lithium tris(trifluoromethanesulfonyl)methide, lithium bis(oxalato)borate, lithium difluoro(oxalato)borate, $Li_2B_{12}F_{12-x}H_x$ where x is equal to 0 to 8, and mixtures of lithium fluoride and anion receptors such as $B(OC_6F_5)_3$.

Mixtures of two or more of these or comparable electrolyte salts may also be used. In one embodiment, an electrolyte salt is present in the electrolyte composition, and the electrolyte salt comprises lithium hexafluorophosphate. In one embodiment, the electrolyte salt comprises lithium bis(trifluoromethanesulfonyl)imide. The electrolyte salt can be present in the electrolyte composition in an amount of about 0.2 M to about 2.0 M, for example from about 0.3 M to about 1.7 M, or for example from about 0.5 M to about 1.2 M, or for example 0.5 M to about 1.7M.

An electrolyte composition as described herein comprises one or more fluorinated solvents. The fluorinated solvent is at least one fluorinated solvent selected from fluorinated acyclic carboxylic acid esters, fluorinated acyclic carbonates, and fluorinated acyclic ethers.

Suitable fluorinated acyclic carboxylic acid esters are represented by the formula:

wherein i) $R^1$ is H, an alkyl group, or a fluoroalkyl group;

ii) $R^2$ is an alkyl group or a fluoroalkyl group;

iii) either or both of $R^1$ and $R^2$ comprises fluorine; and iv) $R^1$ and $R^2$, taken as a pair, comprise at least two carbon atoms but not more than seven carbon atoms.

In one embodiment, $R^1$ is H and $R^2$ is a fluoroalkyl group. In one embodiment, $R^1$ is an alkyl group and $R^2$ is a fluoroalkyl group. In one embodiment, $R^1$ is a fluoroalkyl group and $R^2$ is an alkyl group. In one embodiment, $R^1$ is a fluoroalkyl group and $R^2$ is a fluoroalkyl group, and $R^1$ and $R^2$ can be either the same as or different from each other. In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

In one embodiment, the number of carbon atoms in $R^1$ in the formula above is 1, 3, 4, or 5.

In another embodiment, the number of carbon atoms in $R^1$ in the formula above is 1.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $F_2CHCH_2$—COO—$CH_3$, $F_2CHCH_2$—COO—$CH_2CH_3$, and $F_2CHCH_2CH_2$—COO—$CH_2CH_3$ (ethyl 4,4-difluorobutanoate, CAS No. 1240725-43-2), H—COO—$CH_2CF_2H$ (difluoroethyl formate, CAS No. 1137875-58-1), H—COO—$CH_2CF_3$ (trifluoroethyl formate, CAS No. 32042-38-9), and mixtures thereof. In one embodiment, the fluorinated acyclic carboxylic acid ester comprises 2,2-difluoroethyl acetate ($CH_3$—COO—$CH_2CF_2H$). In one embodiment, the fluorinated acyclic carboxylic acid ester comprises 2,2-difluoroethyl propionate ($CH_3CH_2$—COO—$CH_2CF_2H$). In one embodiment, the fluorinated acyclic carboxylic acid ester comprises 2,2,2-trifluoroethyl acetate ($CH_3$—COO—$CH_2CF_3$). In one embodiment, the fluorinated acyclic carboxylic acid ester comprises 2,2-difluoroethyl formate (H—COO—$CH_2CF_2H$).

In one embodiment, suitable fluorinated acyclic carbonates are represented by the formula $R^3$—OCOO—$R^4$, where $R^3$ and $R^4$ independently represent a linear or branched alkyl group, the sum of carbon atoms in $R^3$ and $R^4$ is 2 to 7, at least two hydrogens in $R^3$ and/or $R^4$ are replaced by fluorines (that is, at least two hydrogens in $R^3$ are replaced by fluorines, or at least two hydrogens in $R^4$ are replaced by fluorines, or at least two hydrogens in $R^3$ and at least two hydrogens in $R^4$ are replaced by fluorines), and neither $R^3$ nor $R^4$ contains a $FCH_2$ or FCH group.

In another embodiment, suitable fluorinated acyclic carbonates are represented by the formula $$R^3\text{—OCOO—}R^4$$

wherein
  i) $R^3$ is a fluoroalkyl group;
  ii) $R^4$ is an alkyl group or a fluoroalkyl group; and
  iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a $FCH_2$— group or a —FCH— group.

Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (ethyl 2,2-difluoroethyl carbonate, CAS No. 916678-14-3), and $CF_3CH_2$—OCOO—$CH_2CH_3$ (ethyl 2,2,2-trifluoroethyl carbonate, CAS No. 156783-96-9).

In one embodiment, suitable fluorinated acyclic ethers are represented by the formula: $R^5$—O—$R^6$, where $R^5$ and $R^6$ independently represent a linear or branched alkyl group, the sum of carbon atoms in $R^5$ and $R^6$ is 2 to 7, at least two hydrogens in $R^5$ and/or $R^6$ (that is, at least two hydrogens in $R^5$ are replaced by fluorines, or at least two hydrogens in $R^6$ are replaced by fluorines, or at least hydrogens in $R^5$ are replaced by fluorines and at least two hydrogens in $R^6$ are replaced by fluorines), are replaced by fluorines and neither $R^5$ nor $R^6$ contains a $FCH_2$ or FCH group.

In another embodiment, suitable fluorinated acyclic ethers are represented by the formula $$R^5\text{—O—}R^6$$

wherein
  i) $R^5$ is a fluoroalkyl group;
  ii) $R^6$ is an alkyl group or a fluoroalkyl group; and
  iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a $FCH_2$— group or a —FCH— group.

Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

The fluorinated solvent may comprise a fluorinated acyclic carboxylic acid ester, a fluorinated acyclic carbonate, a fluorinated acyclic ether, or mixtures thereof. As used herein, the term "mixtures thereof" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate; and a mixture of 2,2-difluoroethyl acetate and 2,2 difluoroethyl methyl carbonate.

In one embodiment, the fluorinated solvent is:
  a) a fluorinated acyclic carboxylic acid ester represented by the formula:

$$R^1\text{—COO—}R^2,$$

b) a fluorinated acyclic carbonate represented by the formula:

$$R^3\text{—OCOO—}R^4,$$

c) a fluorinated acyclic ether represented by the formula:

$$R^5\text{—O—}R^6,$$

or a mixture thereof;
wherein
  i) $R^1$ is H, an alkyl group, or a fluoroalkyl group;
  ii) $R^3$ and $R^5$ is each independently a fluoroalkyl group and can be either the same as or different from each other;
  iii) $R^2$, $R^4$, and $R^6$ is each independently an alkyl group or a fluoroalkyl group and can be either the same as or different from each other;
  iv) either or both of $R^1$ and $R^2$ comprises fluorine; and
  v) $R^1$ and $R^2$, $R^3$ and $R^4$, and $R^5$ and $R^6$, each taken as a pair, comprise at least two carbon atoms but not more than seven carbon atoms.

In another embodiment, the fluorinated solvent is
  a) a fluorinated acyclic carboxylic acid ester represented by the Formula:

$$R^1\text{—COO—}R^2,$$

b) b) a fluorinated acyclic carbonate represented by the Formula:

$$R^3\text{—OCOO—}R^4,$$

c) a fluorinated acyclic ether represented by the Formula:

$$R^5\text{—O—}R^6,$$

or mixtures thereof;
wherein
  i) $R^1$ is H, an alkyl group, or a fluoroalkyl group;
  ii) $R^3$ and $R^5$ is each independently a fluoroalkyl group and can be either the same as or different from each other;
  iii) $R^2$, $R^4$, and $R^6$ is each independently an alkyl group or a fluoroalkyl group and can be either the same as or different from each other;
  iv) either or both of $R^1$ and $R^2$ comprises fluorine; and
  v) $R^1$ and $R^2$, $R^3$ and $R^4$, and $R^5$ and $R^6$, each taken as a pair, comprise at least two carbon atoms but not more than seven carbon atoms and further comprise at least two fluorine atoms, with the proviso that none of $R^1$, $R^2$, $R^3$, $R^4$, $R^5$, nor $R^6$ contains a $FCH_2$— group or a —FCH— group.

In another embodiment, $R^1$ and $R^3$ in the formula above do not contain fluorine, and $R^2$ and $R^4$ contain fluorine.

In the electrolyte compositions disclosed herein, the fluorinated solvent or mixtures thereof can be used in various amounts depending on the desired properties of the electrolyte composition. In one embodiment, the fluorinated solvent comprises about 5% to about 95% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition. In another embodiment, the fluorinated solvent comprises about 60% to about 65% by weight of the electrolyte composition. In another embodiment, the fluorinated solvent comprises about 20% to about 45% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of these fluorinated solvents may be purchased from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation.

The electrolyte composition may further comprise one or more organic carbonates, which can be fluorinated or non-fluorinated, linear or cyclic. Suitable organic carbonates can include, for example: fluoroethylene carbonate, which is also known as 4-fluoro-1,3-dioxolan-2-one, all isomers of trifluoroethylene carbonate; ethylene carbonate, also known as 1,3-dioxalan-2-one; ethyl methyl carbonate; all isomers of difluoroethylene carbonate including 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; tetrafluoroethylene carbonate; dimethyl carbonate; diethyl carbonate; propylene carbonate; vinylene carbonate; di-tert-butyl carbonate; 2,2,3,3-tetrafluoropropyl methyl carbonate; bis(2,2,3,3-tetrafluoropropyl) carbonate; bis(2,2,2-trifluoroethyl) carbonate; 2,2,2-trifluoroethyl methyl carbonate; bis (2,2-difluoroethyl) carbonate; 2,2-difluoroethyl methyl carbonate; dipropyl carbonate; methyl propyl carbonate; ethyl propyl vinylene carbonate; methyl butyl carbonate; ethyl butyl carbonate; propyl butyl carbonate; dibutyl carbonate; vinyl ethylene carbonate; dimethylvinylene carbonate; 2,3,3-trifluoroallyl methyl carbonate; or mixtures thereof.

In some embodiments, the electrolyte composition further comprises at least one cyclic carbonate. In one embodiment, the cyclic carbonate comprises fluoroethylene carbonate and/or ethylene carbonate. In one embodiment, the cyclic carbonate comprises fluoroethylene carbonate. In one embodiment, the cyclic carbonate comprises ethylene carbonate. In one embodiment, the cyclic carbonate comprises propylene carbonate.

In some embodiments, the electrolyte composition comprises 2,2-difluoroethyl acetate, ethylene carbonate, and LiTOP, and optionally further comprises LiBOB. In some embodiments, the electrolyte composition comprises 2,2-difluoroethyl acetate, fluoroethylene carbonate, and LiTOP, and optionally further comprises LiBOB. In some embodiments, the electrolyte composition comprises 2,2-difluoroethyl acetate, fluoroethylene carbonate, LiTOP, LiBOB, and 1,3-propanesultone. In some embodiments, the electrolyte composition comprises 2,2-difluoroethyl acetate, 2,2-difluoroethyl methyl carbonate, fluoroethylene carbonate, and LiTOP, and optionally further comprises 1,3-propanesultone.

In the electrolyte compositions disclosed herein, organic carbonates or mixtures thereof can be used in various amounts depending on the desired properties of the electrolyte composition. In one embodiment, the organic carbonate(s) in combination comprises about 0.5% to about 95% by weight of the electrolyte composition, or about 5% to about 95%, or about 10% to about 80% by weight of the electrolyte composition, or about 20% to about 40% by weight of the electrolyte composition, or about 25% to about 35% by weight of the electrolyte composition. In another embodiment, the organic carbonate(s) comprises about 0.5% to about 10% by weight of the electrolyte composition, or about 1% to about 10%, or about 5% to about 10%. Optionally, the electrolyte compositions disclosed herein can further comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight % to about 10 weight %, alternatively from about 0.05 weight % to about 5 weight % of the electrolyte composition, or alternatively from about 0.5 weight % to about 2 weight % of the electrolyte composition.

Suitable gas-reduction additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-I,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; ethylene carbonate; diethyl carbonate; dimethyl carbonate; ethyl methyl carbonate; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid lithium oxalate, $B_2O_5$, ZnO, and fluorinated inorganic salts.

In another embodiment, there is provided herein an electrochemical cell comprising a housing, an anode and a cathode disposed in the housing and in ionically conductive contact with one another, an electrolyte composition, as described herein above providing an ionically conductive pathway between the anode and the cathode, and a porous or microporous separator between the anode and the cathode. In some embodiments, the electrochemical cell is a lithium ion battery.

The housing may be any suitable container to house the electrochemical cell components. Housing materials are well-known in the art and can include, for example, metal and polymeric housings. While the shape of the housing is not particularly important, suitable housings can be fabricated in the shape of a small or large cylinder, a prismatic case, or a pouch. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, polyamide, polyimide or a combination thereof. The pore size of the porous separator is sufficiently large to permit transport of ions to provide ionically conductive contact between the anode and the cathode, but small enough to prevent contact of the anode and cathode either directly or from particle penetration or dendrites which can form on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525).

Many different types of materials are known that can function as the anode or the cathode. In some embodiments, the cathode can include, for example, cathode electroactive materials comprising lithium and transition metals, such as $LiCoO_2$, $LiNiO_2$, $LiMn_2O_4$, $LiCo_{0.2}Ni_{0.2}O_2$, $LiV_3O_8$, $LiNi_{0.5}Mn_{1.5}O_4$; $LiFePO_4$, $LiMnPO_4$, $LiCoPO_4$, and $LiVPO_4F$. In other embodiments, the cathode active materials can include, for example:

$Li_aCoG_bO_2$ (0.90≤a≤1.8, and 0.001≤b≤0.1);

$Li_aNi_bMn_cCo_dR_eO_{2-f}Z_f$ where 0.8≤a≤1.2, 0.1≤b≤0.9, 0.0≤c≤0.7, 0.05≤d≤0.4, 0≤e≤0.2, wherein the sum of b+c+d+e is about 1, and 0≤f≤0.08;

$Li_aA_{1-b}R_bD_2$ (0.90≤a≤1.8 and 0≤b≤0.5);

$Li_aE_{1-b}R_bO_{2-c}D_c$ (0.90≤a≤1.8, 0≤b≤0.5 and 0≤c≤0.05);

$Li_aNi_{1-b-c}Co_bR_cO_{2-d}Z_d$ where 0.9≤a≤1.8, 0≤b≤0.4, 0≤c≤0.05, and 0≤d≤0.05;

$Li_{1+z}Ni_{1-x-y}Co_xAl_yO_2$ where 0<x<0.3, 0<y<0.1, and 0<z<0.06.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc.

In another embodiment the cathode material is an NMC cathode; that is, a LiNiMnCoO cathode, more specifically, cathodes in which the atomic ratio of Ni:Mn:Co is 1:1:1 ($Li_aNi_{1-b-c}Co_bR_cO_{2-d}Z_d$ where 0.98≤a≤1.05, 0≤d≤0.05, b=0.333, c=0.333, where R comprises Mn) or where the atomic ratio of Ni:Mn:Co is 5:3:2 ($Li_aNi_{1-b-c}Co_bR_cO_{2-d}Z_d$ where 0.98≤a≤1.05, 0≤d≤0.05, c=0.3, b=0.2, where R comprises Mn).

In another embodiment, the cathode comprises a material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and 0.9≤a≤1.2, 1.3≤b≤2.2, 0≤c≤0.7, 0≤d≤0.4.

In another embodiment, the cathode in the electrochemical cell or lithium ion battery disclosed herein comprises a cathode active material exhibiting greater than 30 mAh/g capacity in the potential range greater than 4.6 V versus a $Li/Li^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode comprises a composite material represented by the structure of Formula:

$$x(Li_{2-w}A_{1-v}Q_{w+v}O_{3-e}) \cdot (1-x)(Li_yMn_{2-z}M_zO_{4-d})$$

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In another embodiment, in the Formula $$x(Li_{2w}A_{1-v}Q_{w+v}O_{3-e}) \cdot (1-x)(Li_yMn_{2-z}M_zO_{4-d})$$

x is about 0 to about 0.1, and all ranges for the other variables are as stated herein above.

In another embodiment, the cathode in the lithium ion battery disclosed herein comprises $$Li_aA_{1-x}R_xDO_4Z_f$$

wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

In another embodiment, the cathode in the lithium ion battery ore electrochemical cell disclosed herein comprises a cathode active material which is charged to a potential greater than or equal to about 4.1 V, or greater than or equal to 4.35 V, or greater than 4.5 V, or greater than or equal to 4.6 V versus a Li/Li+ reference electrode. Other examples are layered-layered high-capacity oxygen-release cathodes such as those described in U.S. Pat. No. 7,468,223 charged to upper charging potentials above 4.5 V.

In some embodiments, the cathode comprises a cathode active material exhibiting greater than 30 mAh/g capacity in the potential range greater than 4.6 V versus a Li/Li+ reference electrode, or a cathode active material which is charged to a potential greater than or equal to 4.35 V versus a Li/Li+ reference electrode.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH.H$_2$0 at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

An electrochemical cell or lithium ion battery as disclosed herein further contains an anode, which comprises an anode active material that is capable of storing and releasing lithium ions. Examples of suitable anode active materials include, for example, lithium alloys such as lithium-aluminum alloy, lithium-lead alloy, lithium-silicon alloy, and lithium-tin alloy; carbon materials such as graphite and mesocarbon microbeads (MCMB); phosphorus-containing materials such as black phosphorus, MnP$_4$ and CoP$_3$; metal oxides such as SnO$_2$, SnO and TiO$_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as Li$_4$Ti$_5$O$_{12}$ and LiTi$_2$O$_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi, NEI Inc. (Somerset, N.J.), and Farasis Energy Inc. (Hayward, Calif.).

The electrochemical cell as disclosed herein can be used in a variety of applications. For example, the electrochemical cell can be used for grid storage or as a power source in various electronically powered or assisted devices ("Electronic Device") such as a computer, a camera, a radio, a power tool, a telecommunications device, or a transportation device (including a motor vehicle, automobile, truck, bus or airplane). The present disclosure also relates to an electronic device, a transportation device, or a telecommunication device comprising the disclosed electrochemical cell.

In another embodiment, there is provided a method for forming an electrolyte composition. The method comprises combining a) the fluorinated solvent; b) the oxalate salt represented by the Formula LiPF$_{(6-2q)}$(Ox)$_q$ wherein Ox is an oxalate moiety, and q is 1, 2 or 3;
and c) optionally, at least one electrolyte salt; as defined herein, to form the electrolyte composition. The components can be combined in any suitable order. The step of combining can be accomplished by adding the individual components of the electrolyte composition sequentially or at the same time. In some embodiments, the components a) and b) are combined to make a first solution. After the formation of the first solution, an amount of the electrolyte salt is added to the first solution in order to produce the electrolyte composition having the desired concentration of the electrolyte salt, if desired. Alternatively, the components a) and c) are combined to make a first solution, and after the formation of the first solution an amount of the oxalate salt is added to produce the electrolyte composition. Typically, the electrolyte composition is stirred during and/or after the addition of the components in order to form a homogeneous mixture.

In another embodiment, a method for improving the cycling performance of a lithium ion battery is disclosed, the method comprising the step of incorporating an oxalate salt as described by the Formula $LiPF_{(6-2q)}(Ox)_q$, wherein Ox is an oxalate moiety and q is 1, 2 or 3, in the electrolyte composition as described herein.

EXAMPLES

The concepts disclosed herein will be further described in the following examples, which do not limit the scope of the invention described in the claims.

The meaning of abbreviations used is as follows: "° C." means degrees Celsius; "g" means gram(s), "mg" means milligram(s), "μg" means microgram(s), "L" means liter(s), "mL" means milliliter(s), "μL" means microliter(s), "mol" means mole(s), "mmol" means millimole(s), "M" means molar concentration, "wt %" means percent by weight, "mm" means millimeter(s), "μm" means micrometer(s), "ppm" means parts per million, "h" means hour(s), "min" means minute(s), "psig" means pounds per square inch gauge, "kPa" means kiloPascal(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "NMR" means nuclear magnetic resonance spectroscopy, "GC/MS" means gas chromatography/mass spectrometry, "Ex" means Example and "Comp. Ex" means Comparative Example.
Materials and Methods
Representative Preparation of 2,2-Difluoroethyl Acetate (DFEA)

The 2,2-difluoroethyl acetate used in the Examples and Comparative Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent 19091S-433, 30 m, 250 μm, 0.25 μm; carrier gas —He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3 A molecular sieves, until water was not detectable by Karl Fischer titration (i.e., <1 ppm).
Preparation of Lithium Trisoxalatophosphate (LiTOP)

The LiTOP used in the Examples was prepared according to the following method. Anhydrous oxalic acid (25.0 g; 0.278 mol; mw=90.03; Aldrich 194131) was stirred under vacuum (0.3 torr) at 110° C. for 25 min in a 250-mL RB. Sublimated oxalic acid was scraped off the sides of the flask and anhydrous diethyl ether (40 mL) was added to the dried oxalic acid with magnetic stirring (500 rpm) under nitrogen. Phosphorus pentachloride (17.0 g; 0.082 mol; mw=208.34; Aldrich 157775) was added in ~4-g portions over 1 hr. When all the $PCl_5$ had been added, an additional 5 mL of ether was used to rinse $PCl_5$ off the walls of the flask. The reaction mixture, a clear solution, was stirred at reflux in a 45° C. water bath for 1 hr and then allowed to cool and stir at ambient temperature overnight. The opaque white suspension was stirred in a 60° C. water bath under a nitrogen stream to remove ether, leaving a pale yellow solid cake. The flask was transferred to the glove box (all subsequent operations were done in the glove box), and the solids were broken up and held under high vacuum for 2 hr to remove ether. The solids were stirred with 50 mL diethyl ether and the slurry was suction-filtered. The solids were washed with 100 mL ether in 3 portions and were dried under high vacuum at RT for 2 hr to yield 28.9 g (79%) of trisoxalatophosphoric acid dietherate.

A slurry of 24.4 g (55 mmol) the dietherate obtained above and 55 mL of ether was magnetically stirred at RT in a 250-mL RB flask as 0.8 g lithium hydride (100 mmol; mw=7.95; Aldrich 201049) was added in ~0.1-g portions (foaming) over 30 min. Then 10 mL more ether was added, and the flask was stoppered, removed from the glove box, fitted with a condenser and stirred at reflux under nitrogen in a 60° C. oil bath for 5 hr; after 2 hr 15 mL more ether was added to thin the suspension. The flask was cooled and returned to the glove box and the mixture was rotovapped to dryness at RT. The white, powdery solids were stirred with 50 mL anhydrous diethyl carbonate (DEC; Aldrich 517135) at RT; $^1$H NMR of the supernatant showed the absence of an acidic proton at ~16 ppm. The suspension was suction-filtered through a medium frit to leave ~1 g gray solids (contains LiH). The clear tan filtrate was magnetically stirred under high vacuum with warming over the hotplate set at 100 (surface temp~80° C.) for 30 min during which time the solution became viscous but remained stirrable. The heat was turned off as stirring under vacuum continued for another 30 min, during which time the mixture set up to a stiff white semi-solid mass, about the consistency of drywall spackle. The material was suction-filtered through a medium frit to remove about 5 mL DEC and the damp cake was dispersed in 20 mL methyl t-butyl ether (MTBE; Aldrich 443808) and suction-filtered damp. The product stood in the funnel (no suction) in the glove box over the weekend, during which time it became dry. It was suspended again in 20 mL more MTBE and suction-filtered dry to yield 7.9 g as a fine white powder. The powder was stirred with 20 mL electrolyte grade ethyl methyl carbonate and gravity-filtered through a coarse frit to remove 1.6 g white solids; the clear filtrate was stirred under high vacuum to yield 5.0 g LiTOP.

Lithium Bis(Oxalato)Borate (LiBOB) Purification

In a nitrogen purged dry box, lithium bis(oxalato)borate (LiBOB, Sigma Aldrich, 757136-25G) was purified using the following procedure. 25 grams of LiBOB were added to a 500 mL Erlenmeyer flask equipped with a Teflon-coated stir bar. To this, 125 mL of anhydrous acetonitrile (Sigma Aldrich, Fluka, molecular sieves) was added. The flask was heated at 45° C. for 10 minutes using an oil bath. The mixture was filtered through a fine-pore glass frit (Chem-glass, F, 60 mL) into a 500 mL filter flask with the use of vacuum. The solution was allowed to cool to room temperature, forming a clear solution, and 125 mL of cold toluene (about −25° C.) was added. Immediate precipitation was observed and this mixture was allowed to sit for 20 minutes to allow additional solid formation. The solution was filtered through a fine-pore glass frit (Chemglass, F, 60 mL) into a 500 mL round bottom. The filter cake was washed with cold anhydrous toluene (2×20 mL) and using a glass funnel, transferred to a cylindrical long neck flask. This flask was capped tightly, removed from the glove box, and attached to a Kugelrohr, which was subsequently attached to a high vacuum. This flask was dried under high vacuum (60-100 mtorr) at room temperature overnight, and then at 140° C. under high vacuum (60-80 mtorr) for an additional three days. At this time, the flask was capped and returned to the dry box for all further handling.

Purification of 1,3-Propane Sultone (PS)

1,3-propane sultone (Aldrich, Milwaukee, Wis.) was further purified by the following procedure. 5 g of 1,3-propane sultone was charge to a dried glass sublimator. The pressure was lowered to ~1.8 torr (0.24 kPa). Dry ice was added to the cold finger. The sublimator was heated in a 75° C. oil bath for approximately 3 hours. The sublimator was transferred to a nitrogen dry box and disassembled to harvest the product.

Synthesis of 2,2-Difluoroethyl Methyl Carbonate (DFEMC)

The 2,2-difluoroethyl methyl carbonate used in the Examples was prepared as follows. A solution of 404 mL 2,2-difluoroethanol (DFE; 525 g; 6.40 mol; mw=82.05; D=1.30; bp=95° C.; Synquest 2101-3-02) and 11.6 g 4-(di-methylamino)pyridine (DMAP; 94.9 mmol; 1.5 mol %; mw=122.17; Aldrich 107700) in 4644 mL dichloromethane (DCM) was cooled via a circulating chiller as it stirred under nitrogen in a 20-L jacketed flask with bottom let-down valve, a condenser, overhead stirrer and a dropping funnel. Aqueous NaOH (441 mL; 50 wt % NaOH; 8.3 mol; 30% excess; 0.75 g NaOH/mL; 18.8 M; D=1.52; Aldrich 415413) was added all at once and the mixture was stirred and chilled to 1° C. The mixture was stirred rapidly as 584 mL cold methyl chloroformate (MCF, 712 g; 7.54 mol; 18% excess; mw=94.50; D=1.22; bp=70° C., Aldrich M35304) was added at 5-10 mL/min. The chiller was set at −20° C. to maintain the reaction temperature at 2-3° C. After about half the MCF had been added, the salts in the aqueous phase crystallized and, in the absence of liquid aqueous NaOH, the reaction essentially stopped. Water (300 mL) was added to liquefy the salts and the reaction proceeded again. When the MCF had all been added (1.5 hr total addition time), the DCM was sampled and analyzed by gas chromatography (30-m DB-5; 30° C./5 min, then 10° C./min; He: 13.8 cc/min): 0.97 min (0.006%, DFE); 1.10 min (61.019%, DCM); 1.92 min (0.408%, dimethyl carbonate, DMC); 4.38 min (38.464%, 2,2-difluoroethyl methyl carbonate, DFEMC). DFEMC:DFE=6410; DFEMC:DMC=94. The dichloromethane product solution was drawn off via the bottom valve and the flask was washed out with water; the dichloromethane solution was then returned to the flask and was stirred sequentially with 2×750 mL 5% hydrochloric acid followed by 1.5 L saturated sodium bicarbonate solution and finally dried with magnesium sulfate.

The dichloromethane was distilled off at ~40° C./500 torr (66.6 kPa) from a 5-L flask through a 12" empty column topped with a simple still head. Then the residual pot material was distilled at 100°/250 torr to yield 866 g crude 2,2-difluoroethyl methyl carbonate; GC: DFE 0.011%; DCM 4.733%; DMC 0.646%; DFEMC 94.568%; bis(2,2-difluoroethyl) carbonate (BDFEC) 0.043%. This is a 91% yield of 2,2-difluoroethyl methyl carbonate. The crude DFEMC was redistilled from a 95-113° bath at 285 torr through an 18" glass column packed with 0.16-in SS316 mesh saddles. Fractions 7-10 distilled at about 90° C./285 torr from a 105-113° C. bath. GC-FID analysis of the distillate fractions is shown in the following Table. The pot (25 g) was mostly BDFEC.

TABLE

Analysis of Distillate Fractions

| Fraction | DFE % | DMC % | DFEMC % | BDFEC % | Yield, g |
|---|---|---|---|---|---|
| 7 | 0.0089 | 0.8403 | 99.0496 | 0.0500 | 501 |
| 8 | 0.0019 | 0.0023 | 99.9283 | 0.0522 | 128 |
| 9 | 0.0094 | 0.0300 | 99.3358 | 0.5787 | 61 |
| 10 | 0.0110 | — | 99.0150 | 0.9240 | 11 |

Fractions 7-9 were combined and distilled under partial vacuum (70 torr) from a 100° C. oil bath through a 20-cm× 2.2 cm column packed with 0.16-in SS316 mesh saddles (Ace Glass 6624-04) in four fractions: #1 (23 g), #2 (20 g), #3 (16 g) and #4 (13 g), to remove DFE. The DFE content of the distillates was analyzed by GC: #1 (0.100%), #2 (0.059%), #3 (0.035%) and #4 (0.026%); clearly DFE was decreasing throughout the distillation. The pot material (602 g) was analyzed by GC-FID: DFE 0.0016%; DMC 0.1806%; DFEMC 99.6868%; BDFEC 0.1132%. Combining DMC, DFEMC and BDFEC accounted for 99.9808% of the product; there was 16 ppm DFE present. The product contained 18 ppm water by Karl-Fischer titration.

Examples 1-9

The cathode electrodes were prepared as follows.
Preparation of Primer on Aluminum Foil Current Collector—Using a Polyimide/Carbon Composite The following is a typical procedure used for the preparation of primer on the aluminum foil current collector used in these Examples. To prepare the polyamic acid, a prepolymer was first prepared. 20.6 wt % of pyromellitic dianhydride//4,4'-diaminodiphenyl ether prepolymer (PMDA: ODA prepolymer) was prepared using a stoichiometry of 0.98:1 PMDA/ODA. This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the mole ratio of the anhydride to the amine component was approximately 0.98:1.

In a separate container, a 6 wt % solution of pyromellitic dianhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield viscometer—#6 spindle). This resulted in a finished prepolymer solution in which the calculated final PMDA:ODA ratio was 1.01:1.

5.196 grams of the finished prepolymer was then diluted with 15.09 grams of NMP to create a 5 wt % solution. In a vial, 16.2342 grams of the diluted finished prepolymer solution was added to 0.1838 grams of TimCal Super C-65 carbon black. This was further diluted with 9.561 grams of NMP for a final solids content of 3.4 wt %, with a 2.72 prepolymer: carbon ratio. A Paasche VL#3 Airbrush sprayer (Paasche Airbrush Company, Chicago, Ill.) was used to spray this material onto the aluminum foil (25 µm thick, 1145-0, Allfoils, Brooklyn Heights, Ohio). The foil was weighed prior to spraying to identify the necessary coating to reach a desired density of 0.06 mg/cm2. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm$^2$ of the polyamic acid. Once the foil was dried and at the desired coating, the foil was imidized at 400° C. following the imidization procedure having the temperature profile below:

40° C. to 125° C. (ramp at 4° C./min);
125° C. to 125° C. (soak 30 min);
125° C. to 250° C. (ramp at 4° C./min);
250° C. to 250° C. (soak 30 min);
250° C. to 400° C. (ramp at 5° C./min);
400° C. to 400° C. (soak 20 min).

Coating of the Cathode Electroactive Layer onto the Primed Al Foil

Preparation of the Paste

The following is a typical procedure used for the preparation of the cathodes used in Examples 1-9. The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.0410 g Farasis 1,1,1 NMC (NiCoMn, Farasis Energy, Hayward, Calif.) cathode active powder; 0.3332 g carbon black (Denka uncompressed, DENKA Corp., Japan); 6.1100 g PVDF (polyvinylidene difluoride) solution; and 2.1501 g (portion 1)+0.3900 g NMP (portion 2) (Sigma Aldrich). The materials were combined in a ratio of 90:5:5, cathode active powder: PVDF: carbon black, as described below. The final paste contained 44.7 wt % solids.

The carbon black, the first portion of NMP, and the PVDF solution were first combined in a plastic THINKy container and centrifugally mixed (ARE-310, Thinky USA, Inc., Laguna Hills, Calif.) for 2 minutes at 2000 rpm. The cathode active powder and the 2nd portion of NMP were added and the paste was centrifugally mixed once again at 2000 rpm for 2 minutes. The paste was then immersed in a sonic horn for 3 seconds.

The aluminum foil (25 µm thick, 1145-0, Allfoils, Brooklyn Heights, Ohio) was pretreated with a polyimide/carbon primer.

Coating and Calendaring the Cathode Electrode

The paste was manually cast using doctor blades with a 5 mil gate height plus ½ mil of Kapton® tape onto the primed aluminum foil. The electrodes were dried for 60 min at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar is set to have a nip force (in lb)=37.8×regulator pressure (psi). Loadings of cathode active material were approximately 6.02-7.02 mg/cm$^2$.

The following is a typical procedure used for the preparation of the anodes used in these Examples. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 µm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 µm thick brass sheets and passed through a calender three times using 100 mm diameter steel rolls at ambient temperature with nip forces increasing in each of the passes, starting at 260 kg with the final pass at 770 kg.

Coin Cells

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation using the electrolyte compositions of Examples 1-9. The coin cell parts (case, spacers, wave spring, gasket, and lid) and coin cell crimper were obtained from Hohsen Corp (Osaka, Japan). The separator was a Celgard® Monolayer PP Battery Separator 2500 (Celgard®, Charlotte N.C.).

Electrolyte Preparation

For Examples 1, 2, and 3, the electrolyte composition was prepared by combining 70 wt % of 2,2-difluoroethyl acetate (DFEA) and 30 wt % ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, sufficient $LiPF_6$ (lithium hexafluorophosphate, (BASF, Independence, Ohio) was added to make the formulation 1M in $LiPF_6$. 5.8817 g of this mixture was combined with 0.1203 g of LiTOP to prepare the final electrolyte composition.

For Examples 4 and 5, the electrolyte composition was prepared by combining 70 wt % of 2,2-difluoroethyl acetate and 30 wt % ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, $LiPF_6$ (lithium hexafluorophosphate, BASF, Independence, Ohio) was added. 3.8421 g of this mixture was combined with 0.0810 g of LiBOB and 0.0807 g of LiTOP to prepare the final electrolyte composition.

For Examples 6 and 7, the electrolyte composition was prepared by combining 4.4620 grams of fluoroethylene carbonate (FEC, BASF, Independence, Ohio) and 13.3888 g of 2,2-difluoroethyl acetate. The mixture was dried over 3 A molecular sieves until water content was below 2 ppm as determine by Karl Fischer titration. The mixture was filtered using a 0.2 micron PTFE syringe filter. 2.1135 grams of $LiPF_6$ (BASF, Independence, Ohio) was added to this solution. 1.9620 g of the solution then was combined with 0.0418 g of LiTOP to prepare the final electrolyte composition.

For Examples 8 and 9, the electrolyte composition was prepared by combining 4.7560 grams of fluoroethylene carbonate (FEC, BASF, Independence, Ohio), 7.1269 g of 2,2-difluoroethyl methyl carbonate (DFEMC) and 7.1220 g of 2,2-difluoroethyl acetate (DFEA). The mixture was dried over 3 A molecular sieves until water content was below 1 ppm. The mixture was filtered using a 0.2 micron PTFE syringe filter. 5.0 g of the mixture was combined with 0.1168 g of LiTOP and 0.1168 g of 1,3-propane sultone (PS). 0.5995 g of $LiPF_6$ (BASF, Independence, Ohio) was then added to prepare the final electrolyte composition.

Coin Cell Evaluations at 25° C.

For Examples 1, 2, and 3, the cathode active loadings on the cathode electrode was 6.02-7.02 $mg/cm^2$; the anode active loading on the anode electrode was 4.06-4.39 $mg/cm^2$.

For Examples 4 and 5, the cathode active loading was 6.02-6.17 $mg/cm^2$; the anode active loading was 4.06-4.17 $mg/cm^2$.

For Examples 6 and 7, the cathode active loading was 5.95-6.73 $mg/cm^2$; the anode active loading was 4.06-4.28 $mg/cm^2$.

For Examples 8 and 9, the cathode active loading was 6.02-6.17 $mg/cm^2$; the anode active loading was 4.06-4.17 $mg/cm^2$.

The coin cells were cycled twice for formation using a commercial battery tester (Series 4000, Maccor, Tulsa, Okla.) at ambient temperature using constant current charging and discharging between voltage limits of 3.0-4.6 V at a current of 17.5 mA per gram of cathode active material, which is approximately a 0.1 C rate. Following this procedure, the coin cells were transferred to a 45° C. chamber and cycled using constant current charging and discharging between voltage limits of 3.0-4.6 V at a current of 87.5 mA per gram of cathode active material, which is approximately a C/2 rate. During each charge step, the voltage was subsequently held at 4.6 V until the current tapered to C/20 (approximately 8.75 mA per gram of active cathode material).

Results are presented in Table 1. The term "Cycle Life 80%" is the number of cycles required to reduce the discharge capacity to 80% of the maximum discharge capacity obtained in the first 30 cycles. The minimum first cycle discharge capacity for these Examples was 170 mAh/g.

TABLE 1

Capacity Retention From Coin Cell Cycling Data; 25° C. Evaluations using NMC 111: Graphite Cells at 4.6 V

| Example Number | Electrolyte Composition Solvents and Additives | Mole Ratio Ox/P | Mole Ratio Ox/B | Cycle Life 80% |
|---|---|---|---|---|
| 1 | DFEA/EC (70/30) + 2 wt % LiTOP | 0.25 | — | 172 |
| 2 | DFEA/EC (70/30) + 2 wt % LiTOP | 0.25 | — | 164 |
| 3 | DFEA/EC (70/30) + 2 wt % LiTOP | 0.25 | — | 191 |
| 4 | DFEA/EC (70/30) + 2 wt % LiBOB + 2 wt % LiTOP | 0.51 | 3.93 | 172 |
| 5 | DFEA/EC (70/30) + 2 wt % LiBOB + 2 wt % LiTOP | 0.51 | 3.93 | 172 |
| 6 | DFEA/FEC (75/25) + 2 wt % LiTOP | 0.25 | — | 425 |
| 7 | DFEA/FEC (75/25) + 2 wt % LiTOP | 0.25 | — | 236 |
| 8 | DFEA/DFEMC/FEC (37.5/37.5/25) + 2 wt % LiTOP + 2 wt % PS | 0.26 | — | 330 |
| 9 | DFEA/DFEMC/FEC (37.5/37.5/25) + 2 wt % LiTOP + 2 wt % PS | 0.26 | — | 217 |

Notes:
1) All electrolyte compositions contained 1M $LiPF_6$, based on weight of solvents
2) Solvent ratios are given in parentheses as wt/wt ratios Examples 10-14

Comparative Examples A-H and J

Representative Cathode Preparation Using NMC 532 Powder

The following is a typical procedure used to prepare the cathodes of Examples 10-14. The binder is prepared as a 5% solution of polyvinylidene fluoride (Solef™ 5130 (Solvay, Houston, Tex.)) in N-methylpyrrolidone (Sigma-Aldrich). The following materials were used to make an electrode paste: 9.36 g $LiNi_{0.5}Mn_{0.3}Co_{0.2}O_2$ cathode active powder; 0.52 g carbon black (Super C65 (Timcal)); 10.4 g PVDF (polyvinylidene difluoride) solution and 3.0 g NMP (Sigma Aldrich). The materials were combined in a ratio of 90:5:5, cathode active powder:PVDF:carbon black, as described below.

The carbon black, the additional portion of NMP, and the PVdF solution were combined in a vial and centrifugally mixed (ARE-310, Thinky USA, Inc., Laguna Hills, Calif.) two times, for 60 s at 2000 rpm each time. The cathode active powder was added and the paste was centrifugally mixed two times (2×1 min at 2000 rpm). The rotor-stator shaft of a homogenizer (model PT 10-35 GT, 7.5 mm diameter stator, Kinematicia, Bohemia, N.Y.) was inserted into the vial and the resulting paste was homogenized for 5 min each at 9500 rpm. The paste was then degassed by centrifugal mixing for 1 min at 2000 rpm. The paste was cast using doctor blades with a 0.290 mm gate height onto aluminum foil (25 μm thick, 1145-0, Allfoils, Brooklyn Heights, Ohio) using an automatic coater (AFA-II, MTI Corp., Richmond, Calif.). The electrodes were dried in a mechanical convection oven (model FDL-115, Binder Inc., Great River, N.Y.) with a temperature ramp and hold starting with a 15 min ramp from 80° C.-100° C., followed by a hold at 100° C. The cathodes were placed between 0.5 mm thick stainless steel sheets and passed through a calender three times using 100 mm diameter steel rolls at 125° C. with nip forces increasing on each of the passes, starting at 9 psig (62 kPa) and ending with 30 psig (207 kPa) on the final pass. Loadings of cathode active material were 14.8 mg/cm$_2$.

Representative Anode Preparation

The following is a typical procedure used for the preparation of the anodes used in these Examples. An anode paste was prepared from the following materials: 6.2062 g graphite (CPreme® G5, Conoco-Philips, Huston, Tex.); 0.3406 g carbon black (Super C65, Timcal, Westlake, Ohio); 3.7975 g PVDF (13% in NMP. KFL #9130, Kureha America Corp.); 13.0974 g 1-methyl-2-pyrrolidinone (NMP); and 0.0119 g oxalic acid. The materials were combined in a ratio of 88:0.17:7:4.83, graphite:oxalic acid:PVDF:carbon black, as described below. The final paste contained 29.4% solids.

Oxalic acid, carbon black, half of the NMP, and PVDF solution were combined in a plastic vial. The materials were mixed for 60 s at 2000 rpm using a planetary centrifugal mixer. The mixing was repeated a second time. The graphite was then added along with the remaining NMP. The resulting paste was centrifugally mixed two times. The vial was homogenized using a rotor-stator for 5 min at 10000 rpm, adjusting the vial's location throughout the mixing. The vial was then remixed for 60 s at 2000 rpm.

The paste was cast using a doctor blade with a 290 μm gate height on to copper foil (CF-LBX-10, Fukuda, Kyoto, Japan) using the automatic coater. The electrodes were dried for 30 min at 95° C. in the mechanical convection oven. The resulting 102-mm wide anodes were placed between 390 μm thick stainless steel sheets layered with a sheet of Kapton and passed through a calender four times using 100 mm diameter steel rolls held at 125° C. with nip forces increasing and the film's entry direction shifted 180° in each of the passes, starting at 340 kg with the final pass at 1130 kg.

Loadings of anode active material were approximately 8.4 mg/cm$_2$.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Electrolyte Preparation

For Comparative Examples A, B, and C, the electrolyte composition was prepared by combining 70 weight % of 2,2-difluoroethyl acetate and 30 weight % ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, LiPF$_6$ (lithium hexafluorophosphate, BASF, Independence, Ohio) was added to make the formulated electrolyte at 1 M concentration.

For Examples 10 and 11, the electrolyte composition was prepared by combining 70 weight % of 2,2-difluoroethyl acetate and 30 wt % ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, sufficient LiPF$_6$ (lithium hexafluorophosphate, BASF, Independence, Ohio) was added to make the formulation 1M in LiPF$_6$. 1.96 g of this mixture was combined with 0.04 g of LiTOP to make the final electrolyte composition.

For Examples 12, 13, and 14, the electrolyte composition was prepared by combining 70 weight % of 2,2-difluoroethyl acetate and 30 wt % ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, sufficient LiPF$_6$ (lithium hexafluorophosphate, BASF, Independence, Ohio) was added to make the formulated electrolyte at 1 M concentration. 1.92 g of this mixture was combined with 0.04 g of LiTOP and 0.04 g of lithium bis(trifluoromethane)sulfonimide (LiTFSI, BASF, Independence, Ohio) to make the final electrolyte composition. Lithium bis(trifluoromethane)sulfonamide is also known as lithium bis(trifluoromethanesulfonyl)imide.

For Comparative Examples D, E, and F, the electrolyte composition was prepared by combining ethylene carbonate (EC) at 30 weight percent of the electrolyte composition, and ethyl methyl carbonate (EMC) at 70 weight percent of the electrolyte composition.

For Comparative Examples G, H, and J, the electrolyte composition was prepared by combining 30 weight percent ethylene carbonate and 70 weight percent ethyl methyl carbonate+2 wt % LiTOP.

Coin Cell Formation at 25° C.

The coin cells were initially charged at a 0.25 C rate for 36 min, followed by a 12-hr rest. The first charge was then continued up to 4.35V with a constant voltage hold cutting off at C/20, followed by a rest for 10 min, and then discharge at 0.5 C down to 3.0V. The second cycle consisted of a 10 min rest followed by a 0.2 C rate charge up to 4.35V, with a hold at 4.35V and cutoff of 0.05 C rate. A 10 min rest followed, and then a 0.2 C rate discharge to 3.0V. The formation procedure was performed using a commercial battery tester (Series 4000, Maccor, Tulsa, Okla.) at ambient temperature.

Coin Cell Evaluations at 45° C.:

Following the formation procedure, the cells were placed in an oven at 45° C. and cycled using constant current charging and discharging between voltage limits of 3.0-4.35 V using a repeating protocol of 19 cycles at a current of 170 mA per gram of cathode active material, which is approximately a 1 C rate, followed by 1 cycle at a current of 34 mA/g, which is approximately a 0.2 C rate. This was repeated for 120 cycles.

The discharge capacity retention data at 110 cycles at 45° C. for Comparative Examples A, B, and C, and for Examples 10-14 are presented in Table 2.

The discharge capacity retention data at 120 cycles at 45° C. for Comparative Examples D-H and J are presented in Table 3.

TABLE 2

Capacity Retention From Coin Cell Cycling Data (110 Cycles); 45° C. Evaluations Using NMC 532: Graphite Cells Charged to 4.35 V

| Example Number | Electrolyte Composition | Mole Ratio Ox/P | Percent Capacity Retention at 110 Cycles (%) | Average Percent capacity Retention at 110 Cycles (%) | Coulombic Efficiency at 110 Cycles (%) | Average Coulombic Efficiency at 110 Cycles (%) |
|---|---|---|---|---|---|---|
| Comp. Ex. A | DFEA/EC (70/30) | — | 8.19 | 7.73 | 94.045 | 94.051 |
| Comp. Ex. B | | | 8.51 | | 94.196 | |
| Comp. Ex. C | | | 6.50 | | 93.912 | |
| 10 | DFEA/EC (70/30) + 2 wt % LiTOP | 0.25 | 75.02 | 76.32 | 99.864 | 99.844 |
| 11 | | | 77.62 | | 99.825 | |
| 12 | DFEA/EC (70/30) + 2 wt % LiTOP + 2 wt % LiTFSI | 0.25 | 84.58 | 83.44 | 99.99 | 99.93 |
| 13 | | | 84.09 | | 99.95 | |
| 14 | | | 81.65 | | 99.87 | |

Notes:
1) All electrolyte compositions contained 1M LiPF$_6$, based on weight of solvents
2) Solvent ratios are given in parentheses as wt/wt ratios The results in Table 2 show that coin cells containing an electrolyte composition of EC/DFEA solvents, when combined with LiTOP, have greatly improved capacity retention and coulombic efficiency, as compared to that of coin cells containing an electrolyte composition of the same solvents but without the LiTOP additive.

TABLE 3

Capacity Retention From Coin Cell Cycling Data (120 Cycles); 45° C. Evaluations Using NMC 532: Graphite Cells Charged to 4.35 V

| Example Number | Electrolyte Composition | Mole Ratio Ox/P | Percent Capacity Retention at 120 Cycles (%) | Average Percent Capacity Retention at 120 Cycles (%) | Coulombic Efficiency at 120 Cycles (%) | Average Coulombic Efficiency at 120 Cycles (%) |
|---|---|---|---|---|---|---|
| Comp. Ex. D | EMC/EC (70/30) | — | 91.38 | 75.60 | 99.791 | 99.678 |
| Comp. Ex. E | | | 53.60 | | 99.541 | |
| Comp. Ex. F | | | 81.83 | | 99.701 | |
| Comp. Ex. G | EMC/EC (70/30) + 2 wt % LiTOP | 0.22 | 58.71 | 68.77 | 99.679 | 99.746 |
| Comp. Ex. H | | | 84.05 | | 99.878 | |
| Comp. Ex. J | | | 63.56 | | 99.679 | |

Notes:
1) All electrolyte compositions contained 1M LiPF$_6$, based on weight of solvents
2) Solvent ratios are given in parentheses as wt/wt ratios The results in Table 3 show that coin cells containing a standard non-fluorinated solvent mixture, when combined with LiTOP, do not show an improvement in cycle life as compared to that of coin cells containing the same standard solvent mixture but without the LiTOP additive.

Examples 15-22

Comparative Examples K, L, M, N

For these Examples and Comparative Examples, cathodes were obtained from Farasis Energy, Inc. (Hayward, Calif.). The cathode composition was 90:5:5 wt:wt:wt NMC 532 (approx. LiNi$_{0.5}$Mn$_{0.3}$Co$_{0.2}$O$_2$, Jinhe Ningbo, China): PVDF (Solef® 5130, Solvay, Houston, Tex.): carbon black (Super C65, Timcal, Westlake, Ohio). The current collector was 18 μm-thick aluminum foil, the cathodes had an active coating weight of ~12.6 mg NMC/cm$^2$, and were calendered to reduce porosity.

Graphite anodes were made as described for Examples 1-9. The active coating weight of the anodes was ~8.4 mg G5 graphite/cm$^2$.

Cathodes were punched to 12.7 mm dia., anodes punched to 14.5 mm dia., and combined with Celgard® 2500 separator in CR2032 coin cells (Hoshen, Osaka, Japan). A 1 mm stainless steel spacer was placed in the case, followed by the cathode, 75 μL electrolyte, the separator, 75 μL of additional electrolyte, the anode, a 0.5 mm spacer, a wave spring, and finally the lid.

The electrolyte compositions for Examples 15-22 were made by combining the wt % of the purified solvents as indicated in Table 5, drying the solvent mixture with molecular sieves, adding LiPF$_6$ salt to make 1 M concentration, and then adding the indicated wt % of the additive, if any, as indicated in Table 5.

Formation for the coin cells comprised, at 25° C., a 16 h OCV rest; Cycle 1: 36 min charge at 42.5 mA/g of NMC (~0.25 C), 48 h rest OCV, CC charge at 42.5 mA/g to 4.35 V, CV charge at 4.35 V until current drops below 8.5 mA/g (~0.05 C), CC discharge at 85 mA/g (~0.5 C) to 3.0V; Cycle 2: CC charge at 34 mA/g (~0.2 C) to 4.35 V; CV charge to 8.5 mA/g, CC discharge at 34 mA/g to 3.0V. Following formation, the cells were placed in a chamber at 45° C. and cycled CC charge 170 mA/g (~1 C) to 4.35 V+CV charge to 8.5 mA/g; CC discharge at 170 mA/g to 3.0 V. Cycle life is the number of cycles required to reduce the discharge capacity to 80% of the maximum discharge capacity obtained in the first 30 cycles. Results are presented in Table 4.

TABLE 4

Capacity Retention From Coin Cell Cycling Data; Evaluations Using NMC 532: Graphite Cells

| Example Number | Electrolyte Composition | Mole Ratio Ox/P | Mole Ratio Ox/B | Discharge Capacity 2$^{nd}$ Cycle 25° C. (mAh/g) | Cycle Life to 80% 45° C. |
|---|---|---|---|---|---|
| Comp. Ex. K | EC/DFEA 30/70 | — | — | 152 | 25 |
| Comp. Ex. L | EC/DFEA 30/70 | — | — | 148 | 19 |
| Comp. Ex. M | FEC/DFEA 25/75 | — | — | 158 | 120 |
| Comp. Ex. N | FEC/DFEA 25/75 | — | — | 157 | 124 |
| Ex. 15 | EC/DFEA 30/70 + 2% LiTOP | 0.25 | — | 162 | 246 |
| Ex. 16 | EC/DFEA 30/70 + 2% LiTOP | 0.25 | — | 165 | 209 |
| Ex. 17 | FEC/DFEA 25/75 + 2% LiTOP | 0.25 | — | 156 | 189 |
| Ex. 18 | FEC/DFEA 25/75 + 2% LiTOP | 0.25 | — | 145 | 331 |
| Ex. 19 | FEC/DFEA/DFEMC 30/35/35 + 2% LiTOP | 0.26 | — | 140 | 223 |
| Ex. 20 | FEC/DFEA/DFEMC 30/35/35 + 2% LiTOP | 0.26 | — | 159 | 137 |
| Ex. 21 | EC/DFEA 30/70 + 1% LiBOB + 1% LiTOP | 0.26 | 3.93 | 161 | 165 |
| Ex. 22 | EC/DFEA 30/70 + 1% LiBOB + 1% LiTOP | 0.26 | 3.93 | 158 | 159 |

Notes:
1) All electrolyte compositions contained 1M LiPF$_6$, based on weight of solvents
2) Solvent ratios are given as wt/wt ratios The coin cell results for Examples 15-18 demonstrate higher cycle life with electrolyte compositions containing LiTOP, in comparison to those for coin cells containing the corresponding electrolytes but without LiTOP (Comparative Examples K, L, M, and N). Note that the second cycle discharge capacity of Example 18 appears to be significantly lower than that of Example 17, and may be an outlier. Likewise, the second cycle discharge capacity of Example 19 appears to be significantly lower than that of Example 20, and may be an outlier.

Examples 19-22 demonstrate the use of electrolyte compositions comprising LiTOP and various fluorinated solvent mixtures, with and without LiBOB.

Examples 23-26

The cathode electrodes were prepared as follows. The preparation of the primer on the aluminum foil current collector using a polyimide/carbon composite was performed as described for Examples 1-9. The cathode electroactive layer was prepared and coated on to the primed aluminum foil as described for Examples 10-14.

Anodes were prepared as described for Examples 10-14. For Examples 23 and 24, loadings of cathode active material were 12.8-13.0 mg/cm$^2$, and loadings of anode active material were approximately 7.9-8.0 mg/cm$^2$. For Examples 25 and 26, loadings of cathode active material were 12.0-14.0 mg/cm$^2$, and loadings of anode active material were approximately 7.4-8.0 mg/cm$^2$.

Electrolyte Preparation

For Examples 23 and 24, the electrolyte composition was prepared by combining 49.0758 g of 2,2-difluoroethyl acetate and 16.3632 g of fluoroethylene carbonate (FEC, BASF, Independence, Ohio) in a nitrogen purged drybox. Molecular sieves (3 A) were added and the mixture was dried to less than 1 ppm water. The material was filtered using a 0.25 micron PTFE syringe filter. 2.6544 g of this mixture was combined with 0.0829 g of LiTOP and briefly agitated. 0.3436 g of LiPF$_6$ (lithium hexafluorophosphate, (BASF, Independence, Ohio) was added to prepare the final electrolyte composition.

For Examples 25 and 26, the electrolyte composition was prepared by combining 49.0758 g of 2,2-difluoroethyl acetate and 16.3632 g of fluoroethylene carbonate (FEC, BASF, Independence, Ohio) in a nitrogen purged drybox. Molecular sieves (3 A) were added and the mixture was dried to less than 1 ppm water. The material was filtered using a 0.25 micron PTFE syringe filter. 2.6540 g of the mixture described above was combined with 0.0551 LiBOB and 0.0854 g of LiTOP and briefly agitated. 0.3414 g of LiPF$_6$ was added to prepare the final electrolyte composition.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Evaluations at 45° C.

Following the formation procedure, the cells were placed in an oven at 45° C. and cycled using constant current charging and discharging between voltage limits of 3.0-4.35 V using a repeating protocol of 19 cycles at a current of 170 mA per gram of cathode active material, which is approximately a 1 C rate, followed by 1 cycle at a current of 34 mA/g, which is approximately a 0.2 C rate.

The cycle life is shown in Table 5 as the number of cycles needed for the cell to decay to 80% of its initial capacity at 45° C.

TABLE 5

Capacity Retention From Coin Cell Cycling Data; Evaluations Using NMC 532: Graphite Cells

| Example Number | Electrolyte Composition | Mole Ratio Ox/P | Mole Ratio Ox/B | Cycle Life 80% | Average Cycle Life 80% |
|---|---|---|---|---|---|
| 23 | DFEA/FEC 75/25 + 2 wt % LiTOP | 0.25 | — | 213 | 197 |
| 24 | DFEA/FEC 75/25 + 2 wt % LiTOP | 0.25 | — | 182 | |
| 25 | DFEA/FEC 75/25 + 1.75 wt % LiBOB + 2 wt % LiTOP | 0.48 | 4.20 | 196 | 370 |
| 26 | DFEA/FEC 75/25 + 1.75 wt % LiBOB + 2 wt % LiTOP | 0.48 | 4.20 | 545 | |

Notes:
1) All electrolyte compositions contained 1M $LiPF_6$, based on weight of solvents
2) Solvent ratios are given in parentheses as wt/wt ratios The data in Table 5 demonstrates that the average cycle life (80% capacity retention) is greater for the electrolyte containing both LiTOP and LiBOB.

What is claimed is:

1. An electrolyte composition comprising:
   a) a fluorinated solvent, which is a fluorinated acyclic carboxylic acid ester CH3—COO—$CH_2CF_2H$, wherein said fluorinated solvent comprises 30% to 75% by weight of the electrolyte composition;
   b) from about 0.01 wt % to 25 wt % based on the total weight of the electrolyte composition of an oxalate salt represented by the Formula:

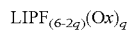
   $LIPF_{(6-2q)}(Ox)_q$ wherein Ox is an oxalate moiety, and q is 1, 2 or 3, wherein the oxalate salt comprises lithium tris(oxalato)phosphate; and
   c) optionally, at least one electrolyte salt.

2. The electrolyte composition of claim 1, wherein the electrolyte composition comprises a mole ratio of Ox/P in the range of from about 0.001 to about 5.

3. The electrolyte composition of claim 2, wherein the mole ratio of Ox/P is in the range of from about 0.1 to about 0.5.

4. The electrolyte composition of claim 2, wherein the electrolyte composition further comprises lithium bis(oxalato)borate, and the mole ratio of Ox/B of the electrolyte composition is above 2.

5. The electrolyte composition of claim 1, wherein the electrolyte salt is present, and the electrolyte salt comprises $LiPF_6$.

6. The electrolyte composition of claim 1, further comprising at least one cyclic carbonate.

7. The electrolyte composition of claim 6, wherein the cyclic carbonate comprises fluoroethylene carbonate and/or ethylene carbonate.

8. The electrolyte composition of claim 1, wherein the composition further comprises:
   i) a cyclic sultone represented by the formula:

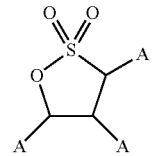

wherein each A is independently a hydrogen, fluorine, or an optionally fluorinated alkyl, vinyl, allyl, acetylenic, or propargyl group;

ii) a cyclic sulfate represented by the formula:

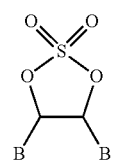

wherein each B is independently a hydrogen or an optionally fluorinated vinyl, allyl, acetylenic, propargyl, or $C_1$-$C_3$ alkyl group;

iii) a cyclic carboxylic acid anhydride selected from the group consisting of the compounds represented by Formula (I) through Formula (VIII):

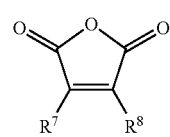
   I

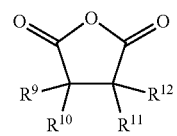
   II

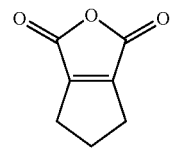
   III

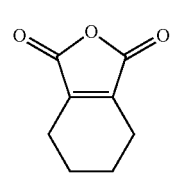
   IV

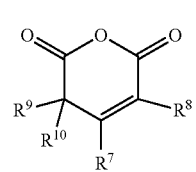
   V

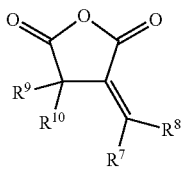

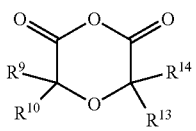

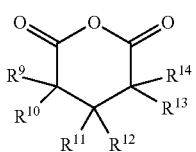

wherein $R^7$ to $R^{14}$ is each independently H, F, a linear or branched $C_1$ to $C_{10}$ alkyl radical optionally substituted with F, alkoxy, and/or thioalkyl substituents, a linear or branched $C_2$ to $C_{10}$ alkene radical, or a $C_6$ to $C_{10}$ aryl radical; or a combination thereof.

9. The electrolyte composition of claim 8, wherein the cyclic sultone comprises 1,3-propane sultone.

10. An electrochemical cell comprising:
(a) a housing;
(b) an anode and a cathode disposed in the housing and in ionically conductive contact with one another;
(c) the electrolyte composition of claim 1 disposed in the housing and providing an ionically conductive pathway between the anode and the cathode; and
(d) a porous separator between the anode and the cathode.

11. The electrochemical cell of claim 10, wherein the electrochemical cell is a lithium ion battery.

12. The electrochemical cell of claim 11, wherein the cathode comprises a cathode active material exhibiting greater than 30 mAh/g capacity in the potential range greater than 4.6 V versus a Li/Li$^+$ reference electrode, or a cathode active material which is charged to a potential greater than or equal to 4.35 V versus a Li/Li$^+$ reference electrode.

13. The electrochemical cell of claim 11, wherein the cathode comprises:
a) a lithium-containing manganese composite oxide having a spinel structure as active material, the lithium-containing manganese composite oxide being represented by the formula:

wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3; or b) a composite material represented by the structure of Formula:

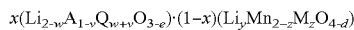

wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;

e is 0 to about 0.3;
v is 0 to about 0.5;
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the Li$_y$Mn$_{2-z}$M$_z$O$_{4-d}$ component has a spinel structure and the Li$_{2-w}$Q$_{w+v}$A$_{1-v}$O$_{3-e}$ component has a layered structure; or c) Li$_a$Mn$_b$J$_c$O$_4$Z$_d$
wherein:
J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and 0.9≤a≤1.2, 1.3≤b≤2.2, 0≤c≤0.7, 0≤d≤0.4; or d) Li$_a$Ni$_b$Mn$_c$Co$_d$R$_e$O$_{2-f}$Z$_f$,
wherein:
R is Al, Ni, Co, Mn, Cr, Fe, Mg, Sr, V, Zr, Ti, a rare earth element, or a combination thereof;
Z is F, S, P, or a combination thereof; and
0.8≤a≤1.2, 0.1≤b≤0.9, 0.0≤c≤0.7, 0.05≤d≤0.4, 0≤e≤0.2; wherein the sum of b+c+d+e is about 1; and 0≤f≤0.08; or e) Li$_a$A$_{1-b}$R$_b$D$_2$,
wherein:
A is Ni, Co, Mn, or a combination thereof;
R is Al, Ni, Co, Mn, Cr, Fe, Mg, Sr, V, Zr, Ti, a rare earth element, or a combination thereof;
D is O, F, S, P, or a combination thereof; and
0.90≤a≤1.8 and 0≤b≤0.5; or f) Li$_a$A$_{1-x}$R$_x$DO$_{4-f}$Z$_f$,
wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
0.8≤a≤2.2;
0≤x≤0.3; and
0≤f≤0.1.

14. An electronic device, transportation device, or telecommunications device, comprising an electrochemical cell according to claim 10.

15. A method comprising:
combining:
a) a fluorinated solvent, which is a fluorinated acyclic carboxylic acid ester CH$_3$—COO—CH$_2$CF$_2$H, wherein said fluorinated solvent comprises 30% to 75% by weight of the electrolyte composition;
b) from about 0.01 wt % to 25 wt % based on the total weight of the electrolyte composition of an oxalate salt represented by the Formula:

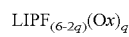

wherein Ox is an oxalate moiety, and q is 1, 2 or 3, wherein the oxalate salt comprises lithium tris(oxalato) phosphate;
c) and optionally, at least one electrolyte salt;
to form an electrolyte composition.

* * * * *

UNITED STATES PATENT AND TRADEMARK OFFICE
CERTIFICATE OF CORRECTION

PATENT NO. : 11,289,738 B2
APPLICATION NO. : 15/749807
DATED : March 29, 2022
INVENTOR(S) : Samuel David Arthur et al.

It is certified that error appears in the above-identified patent and that said Letters Patent is hereby corrected as shown below:

In the Specification

At Column 33, Claim number 1, Line number 35, "CH3–COO–CH$_2$CF$_2$H" should read
-- CH$_3$–COO–CH$_2$CF$_2$H --, At Column 33, Claim number 1, Line number 43, "LIPF$_{(6-2q)}$(Ox)$_q$" should read -- LiPF$_{(6-2q)}$(Ox)$_q$ --, At Column 36, Claim number 15, Line number 58, "LIPF$_{(6-2q)}$(Ox)$_q$" should read -- LiPF$_{(6-2q)}$(Ox)$_q$ --.

Signed and Sealed this
Nineteenth Day of July, 2022

Katherine Kelly Vidal
*Director of the United States Patent and Trademark Office*